(12) United States Patent
Morello (10) Patent No.: US 7,607,154 B2
(45) Date of Patent: Oct. 20, 2009

(54) SYSTEM FOR THE TRANSMISSION OF DVB/MPEG DIGITAL SIGNALS, PARTICULARLY FOR SATELLITE COMMUNICATION

(75) Inventor: Alberto Morello, Turin (IT)

(73) Assignee: Rai Radiotelevisione Italiana S.p.A., Rome (IT)

( * ) Notice: Subject to any disclaimer, the term of this patent is extended or adjusted under 35 U.S.C. 154(b) by 1102 days.

(21) Appl. No.: 10/678,266

(22) Filed: Oct. 6, 2003

(65) Prior Publication Data

US 2004/0073929 A1 Apr. 15, 2004

(30) Foreign Application Priority Data

Oct. 4, 2002 (IT) .......................... TO2002A0858

(51) Int. Cl.
*H04N 7/20* (2006.01)
(52) U.S. Cl. .................. 725/63; 725/67; 370/395.61; 370/395.64
(58) Field of Classification Search .............. 725/63, 725/67; 370/395.61, 395.64
See application file for complete search history.

(56) References Cited

U.S. PATENT DOCUMENTS

| | | | | |
|---|---|---|---|---|
| 5,914,962 A | * | 6/1999 | Fimoff et al. ............... | 370/538 |
| 5,920,572 A | * | 7/1999 | Washington et al. ........ | 370/535 |
| 6,011,950 A | * | 1/2000 | Young ......................... | 725/67 |
| 6,097,739 A | * | 8/2000 | Yamashita .................. | 370/528 |
| 6,128,678 A | * | 10/2000 | Masteller ..................... | 710/52 |
| 6,154,772 A | * | 11/2000 | Dunn et al. ................. | 725/114 |
| 6,181,711 B1 | | 1/2001 | Wu Fang et al. | |
| 6,771,657 B1 | * | 8/2004 | Elstermann ................ | 370/465 |
| 6,879,768 B1 | * | 4/2005 | Ono et al. .................... | 386/46 |
| 2002/0159457 A1 | * | 10/2002 | Zhang et al. ................ | 370/391 |
| 2003/0103445 A1 | * | 6/2003 | Steer et al. .................. | 370/208 |

FOREIGN PATENT DOCUMENTS

| | | | |
|---|---|---|---|
| WO | 0208864 | A | 1/2002 |
| WO | 0209298 | A | 1/2002 |
| WO | 0235853 | A | 5/2002 |

OTHER PUBLICATIONS

Goldsmith, A., "Adaptive Modulation and Coding for Fading Channels", Information Theory and Communications Workshop, Proceedings of the 1999 IEEE Kruger National Park, South Africa Jun. 20-25, 1999, Piscataway, NJ.
Morello, A. et al., "New DVB Standard For DSNG—and Contribution Satellite Links—", EBU Review-Technical, European Broadcasting Union, Brussels, BE, No. 277, pp. 31-45, Sep. 21, 1998.
European Search Report dated Dec. 11, 2003.

* cited by examiner

*Primary Examiner*—Andrew Y Koenig
*Assistant Examiner*—Alfonso Castro
(74) *Attorney, Agent, or Firm*—Browdy and Neimark, PLLC (57) ABSTRACT

The streams from a plurality of VBR coders or generic data sources (31) are multiplexed to a single stream by a multiplexer (32), while inserting null packets to make their bit-rates uniform. A null-packet eliminator (60) removes the null packets from the stream, while signaling their positions, and inputs the stream to an ACM modulator (62) which codes the stream with the maximum ruggedness allowed by the rate of the incoming useful packets, and transmits the stream over a satellite channel. In the receiving station, the stream is demodulated by an ACM demodulator (64), and the null packets are re-inserted into the stream by a re-inserter (66), based on the received signaling. A bit-rate control circuit (72) receives from the transmitting station, over a return channel, a signaling of the quality of the received signal (QoS) and modifies the bit-rate of the VBR coders or generic data sources (31) accordingly.

12 Claims, 4 Drawing Sheets

SYSTEM FOR THE TRANSMISSION OF DVB/MPEG DIGITAL SIGNALS, PARTICULARLY FOR SATELLITE COMMUNICATION

BACKGROUND OF THE INVENTION

1. Field of the Invention

This invention is concerned with a system for the transmission of DVB/MPEG digital signals, particularly for satellite communication.

2. Description of the Prior Art

Transmission of digital TV multimedia signals using the DVB/MPEG protocol is used not only for point-to-multipoint transmission, such as broadcasting radio or TV programs over a territory, but also for point-to-point transmission, such as radio links, data downloads, IP services. In both cases, the transmission is addressed to users that are scattered over a wide territory, over which the weather conditions may vary in both space and time, thereby inducing changes in the quality of propagation along the satellite link. In order to ensure a satisfactory quality of service (QoS) substantially under all conditions, the ability to correct the errors of the transmission system has to be designed for the worst case, and is consequently turns out to be vastly oversized in the average service conditions, thereby entailing an overall waste of the transponder's power, which can attain the order of 90%.

In the case of radio and television broadcasts, i.e. where the same signal is addressed to all the users in a given territory, such oversizing is unavoidable, because the same signal must be simultaneously received in areas of the territory where the quality of reception is potentially different. However, where the signals are intended for individual users, it would be possible, in principle, to devise a transmission system whose ruggedness is matched to the conditions of propagation at the level of the physical layer, as it is known in other kinds of transmission, by means of the so-called ACM technique (Adaptive Coding and Modulation). In the ACM transmission, the modulator is able to use codings having different ruggedness (QPSK, 8PSK, 16QAM, etc., together with a code having a ratio 1/2, 2/3, 3/4, etc.), whereby the spectral efficiencies decrease with increasing ruggedness; consequently, the ruggedness can be increased on request by the receiver over the return channel, with the penalty of a reduction of the useful bit-rate (see A. Goldsmith, *Adaptive modulation and coding for fading channels,* Proceedings of the 1999 IEEE, 1999).

The rigidity of the DVB/MPEG protocol has made it impossible in the past to use the adaptive technique mentioned above. More particularly, the standards of this protocol specify that both the chronological order and the rate of the packets be conserved at reception, and that the overall bit-rate of the transport stream be held constant, because these values are used by the receiver for restoring the program synchronization clock: this circumstance, as will be obvious for a person skilled in the art, has been regarded as irreconcilable with the change of bit-rate required for adapting the system to different conditions of transmission.

SUMMARY OF THE INVENTION

It is therefore the main object of the invention to provide a system for the transmission of DVB/MPEG digital signals, particularly for satellite communication, whose ruggedness, or noise protection level, can be adapted to the channel conditions, while complying with the DVB/MPEG standards.

The invention attains the above object, as well as other objects and advantages such as will appear from the following disclosure, with a system for the transmission of DVB/MPEG digital signals, particularly for satellite communication, having the features recited in claim 1.

The subordinate claims recite other advantageous features of the invention.

BRIEF DESCRIPTION OF THE DRAWINGS

A few preferred embodiments of the invention will now be disclosed, with reference to the attached drawings, wherein.

DESCRIPTION OF THE PREFERRED EMBODIMENTS

Figure 1:
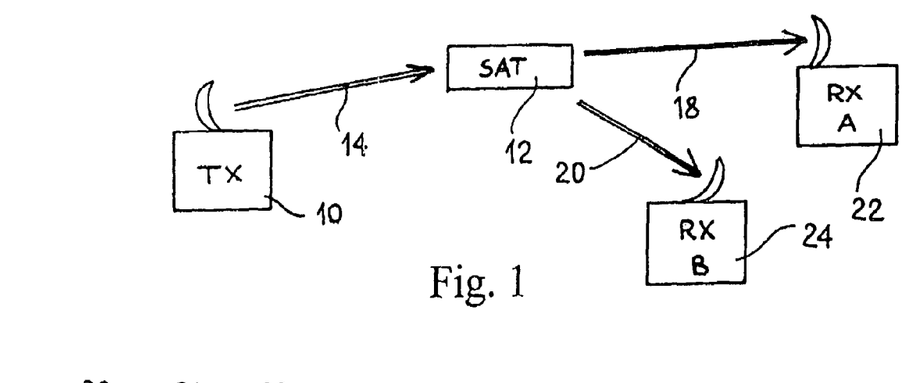
FIG. 1 is a block diagram showing a DVB/MPEG satellite transmission system according to the prior art.

FIG. 1 diagrammatically shows a system for the transmission of DVB/MPEG digital signals, wherein a transmitting station 10 transmits toward a satellite transponder 12 a time-division multiplexed (TDM) signal 14, comprising packets forming a DVB/MPEG Transport Stream. The signal is retransmitted from satellite 12 toward the earth, as shown with 18, 20, . . . , to a number of terrestrial stations such as 22, 24. The transmitted signals typically are television services.

Figure 2:
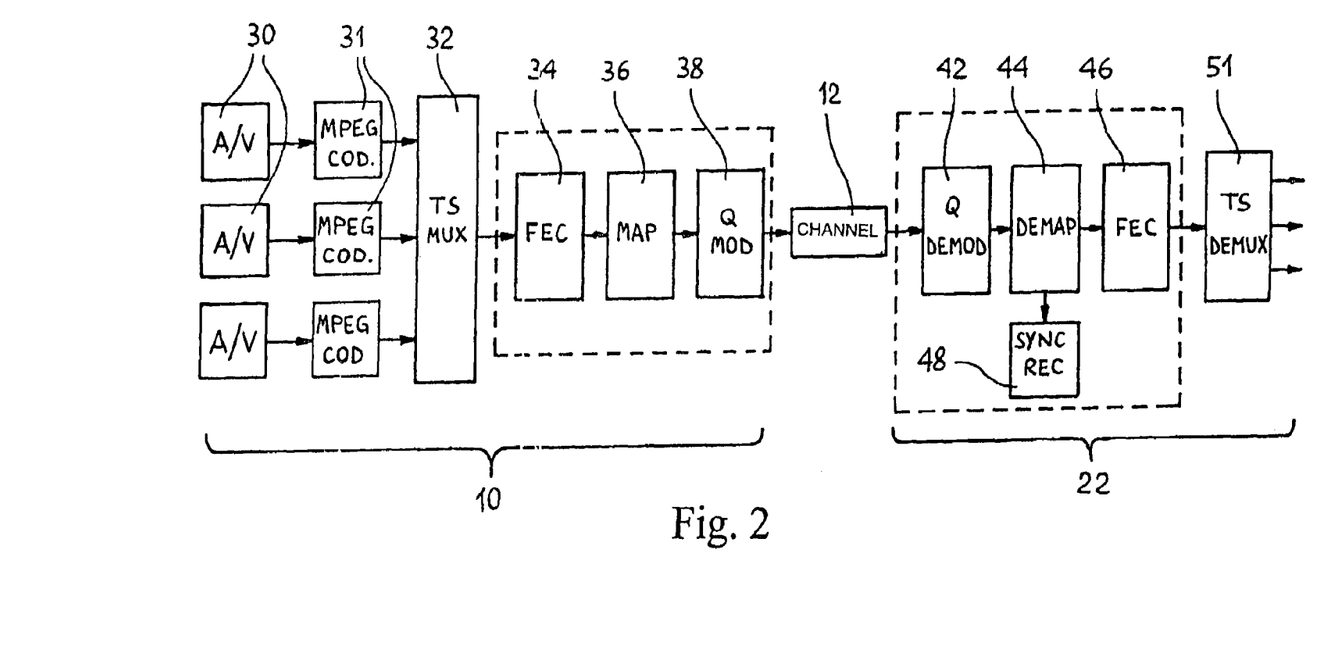
FIG. 2 is a more detailed block diagram of the system of FIG. 1.

The system of FIG. 1 is shown in more detail in FIG. 2. The transmitting station 10 comprises a plurality of sources 30 of audio/video signals, driving respective MPEG coders 31 at a variable bit-rate (VBR). The streams of DVB/MPEG packets generated by coders 31 are applied to respective inputs of a multiplexer 32, which inserts null packets within the individual streams, in a way known per se, to the extent necessary to produce a constant bit-rate, before multiplexing the individual streams into a single transport stream TS, which is then applied to a modulating chain comprising in cascade, as known per se:

a FEC (Forward Error Correction) coder 34, which introduces the desired level of error correction into the signal;

a mapper 36 for mapping the signals to a symbol constellation such as QPSK, 8PSK, 16QAM, etc.

a quadrature modulator 38 for modulating the signal onto a radio-frequency carrier and for radiating it toward the satellite transponder 12.

The receiving station 22, which receives the radio-frequency signal from satellite 12, essentially comprises (complementarily to station 10) a demodulating chain having a quadrature demodulator 42 driving a demapper 44 and a FEC decoder 46, which issues the regenerated packet-formatted transport stream, as known to those skilled in the art. The reconstituted transport stream is demultiplexed in a demultiplexer 51, for subsequent processing (not shown).

As mentioned in the introduction, the MPEG transport streams comply, among other, with the following rules:
- the packet length is fixed (188 bytes);
- the packet header comprises a PID field, with limited address capability (intended for identifying services within the multiplex, rather than for addressing individual users; in particular, a predetermined value of the PID is devoted to label the null packets);
- the packet position in the stream may not be modified in the transmission chain;
- the bit-rate is maintained constant by the addition of null packets;
- the end-to-end transmission delay must be constant.

In general, the transmitted signal might be organized in frames M1, M2, M3, . . . , and might be generated by different coding and channel-modulation modes, depending on the level of protection that has been predetermined for that particular service, with different degrees of ruggedness against interference and transmission noise (obviously, the higher the ruggedness of a given mode, the smaller is the spectral efficiency, defined as the number of transmitted bits per second per unit of bandwidth). As mentioned in the introduction, although it is known in TDM transmissions to dynamically modify the modulation and coding modes adaptively (ACM) in non-MPEG communications, this has not been possible with DVB/MPEG transmissions, because such dynamic adaptation would involve a change of the bit-rate of the signal transmitted in each frame, thereby infringing one of the rules of the DVB/MPEG protocol, which states that the bit-rate of the Transport Stream should be constant.

Figure 3:
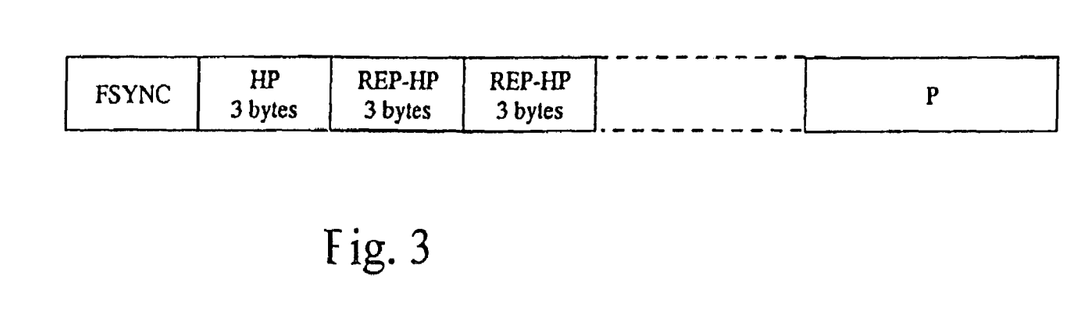
FIG. 3 is a diagram representing one frame of a TDM transmission.

Having now reference to FIG. 3, each frame M1, . . . , Mi, . . . in an ACM system is known to comprise a payload P, containing the useful information, and a header H, using a single modulation (typically BPSK), comprising a FSYNC sequence, which is recognizable by the receiver in order to delimitate the frame boundaries, and a sequence of Hi fields, followed by repetitions REP-Hi for protection from noise. The Hi fields can transport the following data:
- an M sequence, indicating the ACM protection adopted in payload P. If the number of modes is 16, four bits (1 nibble) are sufficient;
- a PLS sequence, for Physical Layer Signalling, through which signalling at the physical level is transmitted from the transmitter to the receiver.

Figure 4:
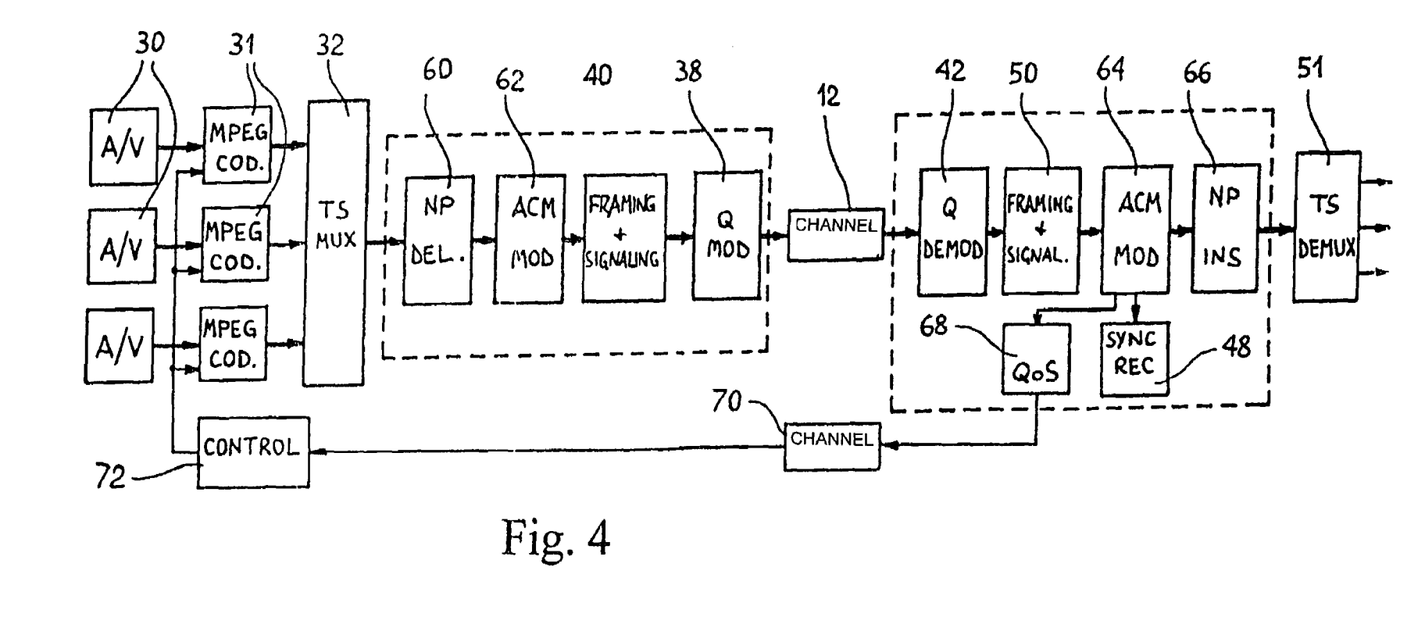
FIG. 4 is a block diagram of a DVB/MPEG system similar to the system of FIG. 2, after being improved according to the invention.

FIG. 4 is the block diagram of a transmitting station and of a receiving station, which are connected via a channel comprising a satellite link, similar to what is shown on FIGS. 1 and 2, but incorporating the principles of the invention. With reference to FIG. 4, where identical parts bear the same reference numbers of FIG. 2, the transmitting station 10 again comprises components such as VBR coders 31, multiplexer 32, quadrature modulator 38, and in practice only differs from the transmitting station of FIG. 2 in that the set of the FEC coder 34 and mapper 36 of FIG. 2 is replaced by a chain comprising in cascade:
- a null-packet eliminator 60, which identifies the null packets NP (based on their PID) and eliminates them from the transiting transport stream, while inserting information about their number and position into the signal, as will be explained below;
- framing and signalling circuits 40 for formatting the signal into frames according to conventional techniques;
- an ACM modulator 62 including FEC coding and mapping of the signal onto the constellations (such as QPSK, 8PSK, 16QAM), with variable bit-rate, the modulator being programmed to apply the modes having the maximum ruggedness allowed by the useful bit-rate of the multiplexed stream.

In complementary fashion, in the receiving station 22, which is largely similar to the receiving station of FIG. 2, the set of FEC decoder 44 and demapper 46 of FIG. 2 is replaced by:
- an ACM demodulator 64 with FEC decoding and the ability to eliminate dummy frames;
- decoding circuits for framing and signalling 50, for controlling the ACM demodulator, according to conventional techniques;
- a null-packet re-inserter 66, which restore the eliminated null packets to the Transport Stream in their original positions, based on the null-packet position information contained in the signal.

Moreover, the receiving station 22 includes an evaluator 68 of the Quality of Service (QoS), driven by the ACM demodulator 64, which delivers a notification of the quality of service to the transmitting station 10 via a return channel 70, typically a low-speed modem link, such as a telephone link or a satellite link. The QoS consists, for example, of the value of the error rate, and its measurement falls within the knowledge of persons skilled in the art.

The signal sent by the evaluator 68 to the transmitting station 10 constitutes a control signal for a bit-rate control circuit 72, which acts on the MPEG coders to raise or drop their output bit-rate depending on the request coming from the QoS evaluator; in other words, if the evaluator detects a low QoS at reception, it will command control circuit 72 to reduce the bit-rate, or to raise it in the opposite case. Therefore, if the bit-rate from the VBR coders is reduced, multiplexer 32 will have to increase the number of inserted null packets, which, however, will then be deleted by eliminator 60.

In the transmitting station according to the invention, the null packets are immediately deleted, but eliminator 60 will signal the positions of the deleted packets in the transport stream, and this information is forwarded to the circuits in the receiving station and is made available to the null-packet re-inserter 66, so that a stream identical to the original one may be reconstituted, as will be explained below.

In the receiving station, the null-packet re-inserter 66 receives information about the number and position of the packets deleted at the start and restores them, thereby recreating a stream identical to the stream generated by multiplexer 32, in compliance with the DVB/MPEG rules.

Figure 5:
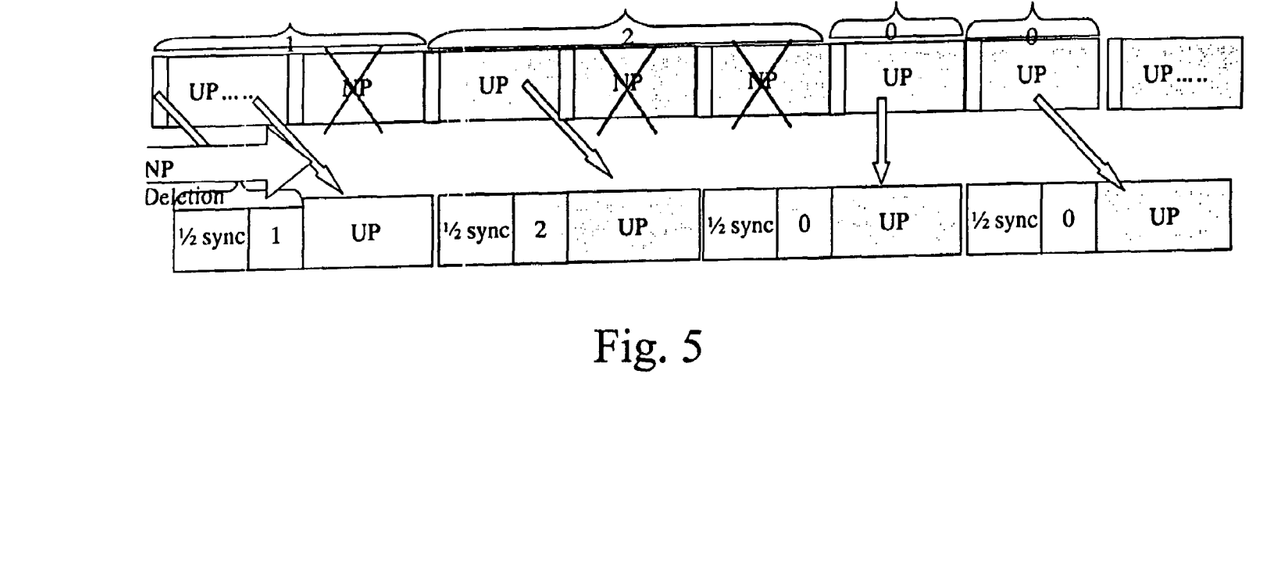
FIG. 5 is a symbolic diagram showing the deletion of the null packets and their signaling in the synchronization bytes of the transmitted useful packets.

Several techniques can be adopted for transmitting the null-packet position information over the transport stream, without interfering with the DVB/MPEG signal, but the presently preferred technique is described below, with reference to FIG. 5, in which the useful packets are shown as UP and the null packets as NP.

According to the above mentioned preferred technique for signaling the positions of the deleted null packets, eliminator 60 incorporates this data in the synchronization byte transmitted with each packet in the Transport Stream. As shown in FIG. 5, which represents the sequence of DVB packets reaching eliminator 60 (above) side by side with the sequence of packets as forwarded downstream of the eliminator (below), only one nibble of the synchronization byte is reserved as a fixed value for the synchronization task, and the remaining nibble is used to signal a number in the range 0 to 15, indicating how many null packets followed the transmitted packet before they were deleted. the number of null packets NP is statistically of the same order of magnitude as the useful packets UP, and therefore the maximum value 15 is sufficient for the data to be transmitted. In the sporadic cases where a useful packet is followed by a sequence of more than 15 null packets, the deletion of one or more null packets may be omitted, with a slight loss of efficiency.

As known to the person skilled in the art, the synchronization byte DVB/MPEG is a predetermined fixed value that is recognized by the receiver and is used to synchronize the receiver's clock. This function is not critical, since it provides merely an adjustment, and it is sufficient to reserve to it one nibble only.

It is obvious that the above described nibble can be retrieved by the circuits in the receiving station and used to drive the null-packet re-inserter so that the null packets are restored exactly as in the original stream.

The operation of the above described system is as follows. The ACM modulator, as known to the person skilled in the art, operates by using the modulation mode having the highest noise protection level, compatibly with the bit-rate that has been predetermined for the transmission. Consequently, the time slots freed by the deletion of null packets by eliminator 60 are used by the ACM modulator to achieve said protection at optimum level. If that level turns out to be insufficient, the QoS evaluator 68 signals the deficiency via the return channel 70 to control circuit 72, which instructs MPEG coders 31 to reduce the bit-rate. Multiplexer 32 will then have to compensate by increasing the number of null packets inserted, which will be deleted and will give rise to a longer stream time available to the ACM modulator for adapting the protection level upwards.

At reception, the ACM demodulator 64 demodulates the stream according to the mode signaled, frame by frame, by framing circuits 50, and delivers the stream, now freed from the protection overhead, to re-inserter 66, which, as dictated by the signaling nibble of the deleted packets, reconstitutes the packet stream identically to the original stream.

On the other hand, whenever the QoS evaluator 68 detects a better quality of signal than the predetermined value, it will instruct the MPEG coders to switch to a higher bit-rate (by allowing the compression of the audio/video signal to be reduced) and, by consequence, multiplexer 32 will insert a smaller number of null packets, while increasing the bit-rate of the signal applied to the ACM modulator 62 and thereby forcing the latter to reduce the noise protection, by changing the coding and modulation mode.

The coding and modulation mode is signaled to the receiving station in each frame header, as known per se.

It can be seen that the system, rather than directly driving the ACM modulator to choose a modulation mode appropriate to the conditions of propagation, forces the modulator to improve or worsen the protection indirectly.

In order to avoid jitter or frequency instability, it is also advisable to uncouple the modulator symbol rate from the useful bit-rate at the output of the null-packet eliminator 60. Accordingly, the null-packet eliminator 60 is preferably capable of inserting dummy frames into the stream, whenever the elimination of the null-packets brings about an excessive depletion of the eliminator buffer. Under these circumstances, too, it is necessary to signal that a given frame is a dummy, so that dummy frames can be removed in the receiving station before reaching the nullpacket re-inserter. This signaling can also be forwarded by a number of devices, but, according to a preferred solution, the fact that a given frame is dummy is indicated by one of the values contained in the field which, in the frame header, signals the ACM mode by which the frame has been created. This choice is not restrictive and is easy to detect in the receiving station.

Figure 6:
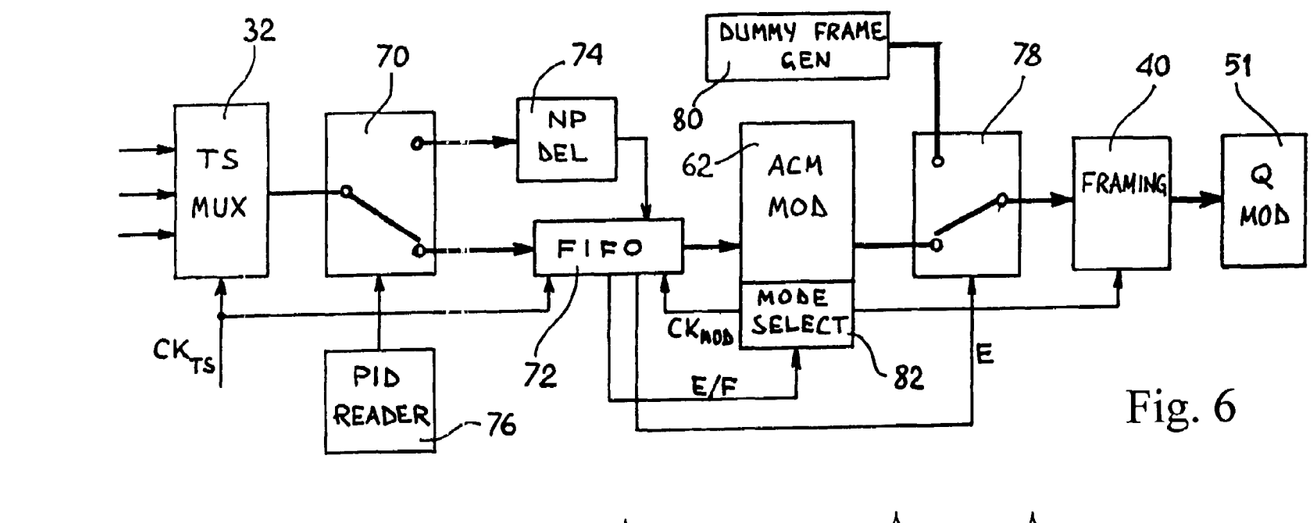
FIG. 6 is a more detailed block diagram of the transmitting station of FIG. 4.

FIG. 6 is a more detailed block diagram of a portion of the transmitting station of FIG. 4, according to a preferred embodiment, and shows more specifically how the deletion of null packets and the generation of dummy frames may be implemented in practice, while inserting into the signal sufficient indications for the receiving station to be able to deterministically reconstitute the original signal.

With reference to FIG. 6, where the same reference numbers used in FIG. 4 have been maintained where possible, multiplexer 32 applies the Transport Stream to a switch 70, connected for directing the stream packets either to a FIFO buffer 72 or to a packet counter 74, depending on a command received from a PID detector 76. The PID detector 76 also receives the Transport Stream from multiplexer 32, examines the PIDs of each packet and diverts toward counter 74 all packets which are designated as null by the value of their PIDs, while it directs all useful packets to buffer 72. Counter 74 counts the null packets which are fed to it, and is reset whenever switch 70 switches from buffer 72. At the end of the counting, counter 74 applies to the buffer a signal to insert the final value of the counting into the last useful packet that is input to the buffer.

The output of buffer 72 goes to ACM modulator 62 and from there to the framing circuit 40 via a switch 78, which in a normal position will direct the packets coming from the ACM modulator to the framing circuit, while in its diverted position will receive the output of a dummy-frame generator 80. Switch 78 is driven by a control signal E from buffer 72, indicating that the buffer is empty. Signal E commands switch 78 to its second position (dummy frame) when buffer 72 is empty, so that a predetermined sequence of bits forming a dummy frame is applied to the framing circuit 40.

Buffer 72 also emits another control signal E/F, which takes logical value 1 when the buffer is more than half-filled and takes logical value 0 when the buffer is less than half-filled. Signal E/F drives a mode selector 82 in the ACM modulator 62 to select a more or less rugged mode, depending on the degree of buffer filling.

It is understood that the framing circuit 40 also receives a signal H from mode selector 82, indicating the modulation and coding mode currently adopted by the ACM modulator, so that this mode can be incorporated in the frame header, to be used in the receiving station for the demodulation.

For proper operation of the system it is necessary, as will be apparent to a person skilled in the art, that the rate of the symbols $CK_{MOD}$ of the ACM modulator 62 is uncoupled from the rate of useful bits $CK_{TS}$ at the buffer input. Accordingly, the clocking of writing to buffer 72 is determined by the same clock signal $CK_{TS}$ which clocks multiplexer 32, while the clocking of reading from buffer 72 is determined by $CK_{MOD}$.

The diagram of FIG. 6 implies that the ACM modulator 62 is capable of automatically adjusting to a coding mode having the highest ruggedness compatible with the bit-rate at its input, but obviously other approaches can be adopted in order to attain the same object. For instance, the mode selection might be signaled in the SI (Service Information) tables that are generated in the multiplexer, depending on the amount of packets inserted in the stream, and the mode selector might obtain the mode instructions by decoding such tables.

Figure 7:
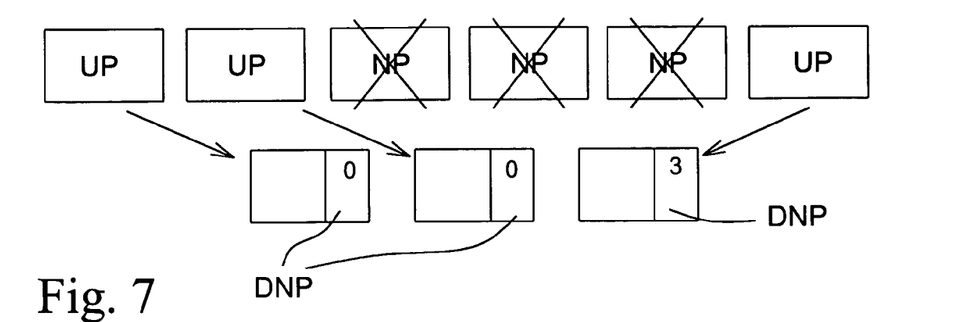
FIG. 7 is a symbolic diagram similar to FIG. 5, showing a different mechanism for signaling the numbers and positions of the deleted null packets according to the invention.

Instead of including the information about the deleted null packets in one nibble of the synchronization byte, a different approach can be used within the principles of the invention, as shown on FIG. 7, where, similarly to FIG. 5, the incoming sequence of DVB packets, which are applied to the null-packet eliminator 60 of FIG. 4, is represented above, while the outgoing sequence of DVB packets is represented below. According to this approach, the eliminator 60 attaches one extra byte DNP to each packet that is forwarded downstream in the transmitting station, the length of each packet being thereby extended to 189 bytes, rather than 188 bytes as provided in the MPEG rules. The eliminator 60 again counts the deleted null packets starting from the first null packet deleted after a useful data packet is forwarded, and when it finds again a useful packet it stores the count reached in the extra byte DNP attached to it. At the receiving station, the nullpacket re-inserter 66 strips the extra byte DNP from each packet received before forwarding it downstream. Moreover, the null-packet re-inserter examines the contents of byte DNP, and generates a number of regular null packets equal to the value of the extra byte. The generated null packets are inserted in the stream before releasing the useful packet concerned. This approach has the advantage of allowing sequences of up to 255 null packets to be handled, at the price of a very slight increase in the overhead due to byte DNP.

The above described system does not provide a dedicated mechanism to the recovery or regeneration of the synchronization clock in the transport stream at the receiving end. The fact that the reconstructed transport stream is identical to the original transport stream in the transmitting station, and the fact that the output buffer is controlled to be half-full in the average, together insure that the synchronization is correct. However, during switching from one ACM protection mode to another, there may be a momentary jitter in the bit-rate, which may cause a brief disturbance to the reception.

Where it is required to preserve the bit-rate more accurately at all times, the invention provides an optional mechanism to regenerate, in the receiver, the clock of the Transport Stream, in order to guarantee end-to-end constant bit rates and delays, even during ACM mode transitions.

Figure 8:
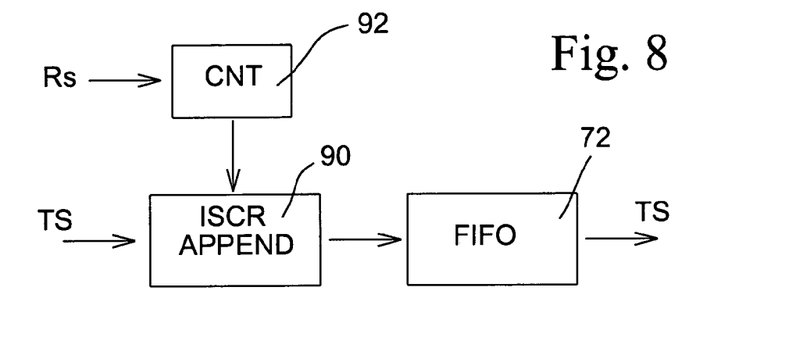
FIG. 8 is a fragmentary block diagram showing a modification of the transmitting station of FIG. 6.

According to this development of the inventive concepts, an input stream synchronization field ISCR is appended after each input packet, before null-packet deletion takes place. The ISCR field is a 2-byte field containing the instantaneous count reached (at the instant the relevant input packet is processed) by a counter clocked by the modulator symbol rate. In the receiving station, the packets are stored in a FIFO buffer similar to the receiver's FIFO buffer of FIG. 6, and are then read from the buffer in succession, while the ISCR field of each packet is stripped from the packet and is compared with the count in a local counter also clocked by the symbol rate. The result of the comparison is used to adjust a PLL which commands the rate of reading of the packets from the buffer. FIG. 8 shows a portion of the transmitting station of FIG. 6 as modified to incorporate the above feature. A block 90 is inserted between switch 70 and FIFO buffer 72, having the function of appending the ISCR field to each packet proceeding to the buffer. The value of the ISCR field appended to the passing packet is the instantaneous count reached by a counter 92, which is clocked by the symbol rate $R_s$.

Figure 9:
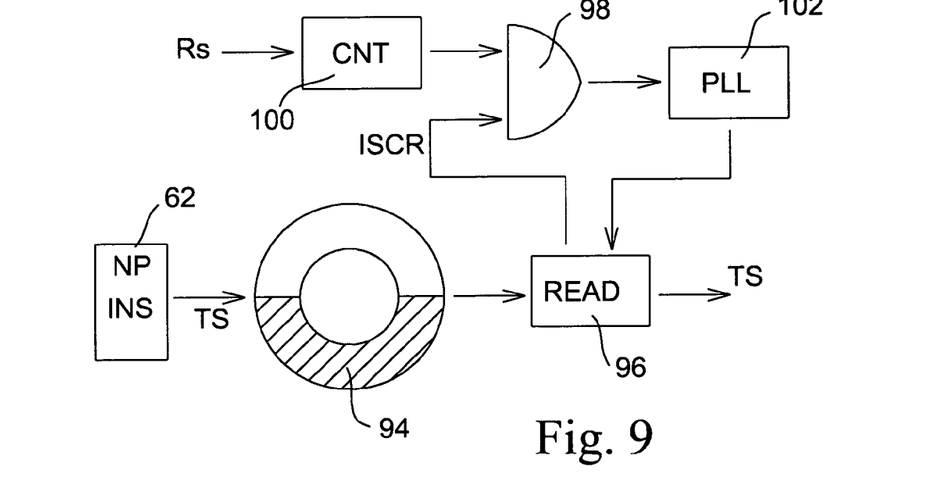
FIG. 9 is a fragmentary block diagram showing a modification of the receiving station of the invention.

FIG. 9 is a block diagram of circuitry that is added in the receiving station, immediately downstream of the demodulation and null-packet inserter 62 of FIG. 4, which takes advantage of the ISCR field provided according to FIG. 8.

The NP inserter regenerates the stream of packets (including both useful and null packets) and feeds them to a FIFO buffer 94, from which the packets are read by a reader 96, stripped of the ISCR field, and fed to TS demultiplexer. At the same time, reader 96 applies the values of the ISCR fields to a comparator 98, where they are compared with the corresponding output from a counter 100 which, similarly to counter 92 of FIG. 8, is clocked by the symbol rate $R_s$. The output of the comparator, which is a phase error, is used to adjust the frequency of a PLL oscillator 102, whose output signal controls the reading rate from buffer 94.

It should be noted that some of the dynamical parameters involved should preferably be initialized, for best efficiency, at the start of reception. However, such initializations are optional or obvious to a person skilled in the art, and therefore they have not been described for the sake of simplicity.

The Figures show preferred embodiments of the invention as functional block diagrams, but the several functions might obviously be implemented with different forms and in different sequences. Further modifications are feasible within the scope of the claims. In particular, the mechanisms for signaling the deleted null packets and the inserted dummy frames might be changed, by adding suitable fields in the DVB/MPEG packets or in the frames. The very transmission of dummy frames, though regarded as appropriate, is unessential for the implementation of the principles of the invention.

The invention claimed is:

1. A system for the transmission of DVB/MPEG digital signals, particularly for satellite communication, said system comprising:
    a transmitting station in which a multiplexer (32) inserts null packets in the DVB/MPEG streams originating from one or more 5 VBR coders or generic data sources (31) so that their bit-rates are made uniform, and multiplexes them into a single transport stream that is then applied to a modulating chain for transmission over a propagation channel, and
    a receiving station in which a demodulating chain receives the signal being transmitted over the channel, reconstitutes the transport stream and applies it to a demultiplexer,
    wherein the modulating chain in the transmitting station comprising:
        a control circuit (72) controlling the bit-rate of the MPEG coders or generic data sources (31);
        a null-packet eliminator (60) for removing null packets from the transport stream received from the multiplexer (32), in order to adapt the bit-rate of the transport stream when the transport stream is transmitted by the transmitting station to the variable channel capacity;
        an ACM modulator (62) downstream of the eliminator, which is programmed for coding the stream with the maximum ruggedness allowed by the rate of the incoming useful packets;
    wherein the receiving station comprises:
        an ACM demodulator (64);
        a null-packet re-inserter (66) for re-inserting null packets in the transport stream;
        an evaluator of quality of service (68) driven by the ACM demodulator (64) for notifying the level of quality of the received signal to the bit-rate control circuit (72) of the transmitting station via a return channel; and
        wherein the bit-rate control circuit (72) is programmed to change the bit-rate of the VBR coder or coders or generic data sources (31) depending on the level of quality of service notified by the evaluator (68),
    wherein the null-packet eliminator introduces into the transmitted signal indications of the number and position of the eliminated null packets and the null-packet re-inserter uses said indications to restore the null packets.

2. The system of claim 1, wherein said indications of number and position of the eliminated null packets consist of at least one byte appended to each DVB packet applied to the ACM modulator, which value represents the number of null packets that have been deleted by the null-packet eliminator before said DVB packet applied to the ACM modulator and after the previous DVB packet applied.

3. The system of claim 1, wherein the transmitting station further comprises a 20 dummy-frame inserter (80) controlled for inserting dummy frames in the stream downstream of the null-packet eliminator when the useful packets are not sufficient to feed the ACM modulator.

4. A system for the transmission of DVB/MPEG digital signals, particularly for satellite communication, said system comprising:
a transmitting station in which a multiplexer (32) inserts null packets in the DVB/MPEG streams originating from one or more 5 VBR coders or generic data sources (31) so that their bit-rates are made uniform, and multiplexes them into a single transport stream that is then applied to a modulating chain for transmission over a propagation channel, and
a receiving station in which a demodulating chain receives the signal being transmitted over the channel, reconstitutes the transport stream and applies it to a demultiplexer,
wherein the modulating chain in the transmitting station comprising:
a control circuit (72) controlling the bit-rate of the MPEG coders or generic data sources (31);
a null-packet eliminator (60) for removing null packets from the transport stream received from the multiplexer (32);
an ACM modulator (62) downstream of the eliminator, which is programmed for coding the stream with the maximum ruggedness allowed by the rate of the incoming useful packets;
wherein the receiving station comprises:
an ACM demodulator (64);
a null-packet re-inserter (66) for re-inserting null packets in the transport stream;
an evaluator of quality of service (68) driven by the ACM demodulator (64) for notifying the level of quality of the received signal to the bit-rate control circuit (72) of the transmitting station via a return channel; and
wherein the bit-rate control circuit (72) is programmed to change the bit-rate of the VBR coder or coders or generic data sources (31) depending on the level of quality of service notified by the evaluator (68), wherein the null-packet eliminator introduces into the transmitted signal indications of the number and position of the eliminated null packets and the null-packet re-inserter uses said indications to restore the null packets, and
wherein each packet of the DVB Transport Stream is provided with a synchronization byte, and wherein said indications of number and position of the eliminated null packets consist of a value incorporated in one of the nibbles of the synchronization byte of each DVB packet applied to the ACM modulator, which value represents the number of null packets that have been deleted by the null-packet eliminator before said DVB packet applied to the ACM modulator and after the previous DVB packet applied.

5. The system of claim 4, wherein said value incorporated in one of the nibbles of the synchronization byte of each DVB packet is in the range 0 to 15.

6. The system of claim 4, wherein said indications of number and position of the eliminated null packets consist of at least one byte appended to each DVB packet applied to the ACM modulator, which value represents the number of null packets that have been deleted by the null-packet eliminator before said DVB packet applied to the ACM modulator and after the previous DVB packet applied.

7. A system for the transmission of DVB/MPEG digital signals, particularly for satellite communication, said system comprising:
a transmitting station in which a multiplexer (32) inserts null packets in the DVB/MPEG streams originating from one or more 5 VBR coders or generic data sources (31) so that their bit-rates are made uniform, and multiplexes them into a single transport stream that is then applied to a modulating chain for transmission over a propagation channel, and
a receiving station in which a demodulating chain receives the signal being transmitted over the channel, reconstitutes the transport stream and applies it to a demultiplexer,
wherein the modulating chain in the transmitting station comprising:
a control circuit (72) controlling the bit-rate of the MPEG coders or generic data sources (31);
a null-packet eliminator (60) for removing null packets from the transport stream received from the multiplexer (32);
an ACM modulator (62) downstream of the eliminator, which is programmed for coding the stream with the maximum ruggedness allowed by the rate of the incoming useful packets;
wherein the receiving station comprises:
an ACM demodulator (64);
a null-packet re-inserter (66) for re-inserting null packets in the transport stream;
an evaluator of quality of service (68) driven by the ACM demodulator (64) for notifying the level of quality of the received signal to the bit-rate control circuit (72) of the transmitting station via a return channel; and
wherein the bit-rate control circuit (72) is programmed to change the bit-rate of the VBR coder or coders or generic data sources (31) depending on the level of quality of service notified by the evaluator (68),
wherein the null-packet eliminator comprises a FIFO buffer (72) fed by the multiplexer (32) through a switch (70) which is commutable to a diverted position by a PID detector (76) when the PID of the transiting packet corresponds to a null packet, and in that the switch in the diverted position addresses the packets to a packet counter (74) having an output controlling the FIFO buffer (72) to modify the header of a selected packet in the buffer to incorporate the packet count reached by the counter when the switch returns to the non-diverted position.

8. The system of claim 7, wherein the FIFO buffer is written at the bit-rate of the multiplexer ($CK_{TS}$) and read at the bit-rate of the ACM modulator ($CK_{MOD}$).

9. The system of claim 7, wherein said indications of number and position of the eliminated null packets consist of at least one byte appended to each DVB packet applied to the ACM modulator, which value represents the number of null packets that have been deleted by the null-packet eliminator before said DVB packet applied to the ACM modulator and after the previous DVB packet applied.

10. A system for the transmission of DVB/MPEG digital signals, particularly for satellite communication, said system comprising:

a transmitting station in which a multiplexer (32) inserts null packets in the DVB/MPEG streams originating from one or more 5 VBR coders or generic data sources (31) so that their bit-rates are made uniform, and multiplexes them into a single transport stream that is then applied to a modulating chain for transmission over a propagation channel, and a receiving station in which a demodulating chain receives the signal being transmitted over the channel, reconstitutes the transport stream and applies it to a demultiplexer, wherein the modulating chain in the transmitting station comprising:
- a control circuit (72) controlling the bit-rate of the MPEG coders or generic data sources (31);
- a null-packet eliminator (60) for removing null packets from the transport stream received from the multiplexer (32);
- an ACM modulator (62) downstream of the eliminator, which is programmed for coding the stream with the maximum ruggedness allowed by the rate of the incoming useful packets;

wherein the receiving station comprises:
- an ACM demodulator (64);
- a null-packet re-inserter (66) for re-inserting null packets in the transport stream;
- an evaluator of quality of service (68) driven by the ACM demodulator (64) for notifying the level of quality of the received signal to the bit-rate control circuit (72) of the transmitting station via a return channel; and wherein the bit-rate control circuit (72) is programmed to change the bit-rate of the VBR coder or coders or generic data sources (31) depending on the level of quality of service notified by the evaluator (68), wherein the null-packet eliminator introduces into the transmitted signal indications of the number and position of the eliminated null packets and the null-packet re-inserter uses said indications to restore the null packets, and wherein the transmitting station includes a first counter (92) clocked by the modulator symbol rate ($R_s$), and means (90) for appending to each transmitted packet an input stream synchronization field (ISCR) containing the count reached by the first counter at the instant when each packet is processed, and the receiving station includes a second counter (100) clocked by said recovered symbol rate, a comparator (98) for successively comparing the value contained in the input stream synchronization field (ISCR) of each received packet with the instantaneous count reached by said second counter, and control means driven by the output of the comparator for adjusting the bit-rate of the packets to be delivered to the TS demultiplexer.

11. The system of claim 10, wherein said control means comprise a FIFO buffer (94) for temporarily storing the received packets, and inserted null-packets reading means (96) for retrieving the packets from the FIFO buffer, and oscillator means (102) for generating the packet-retrieval rate of said reading means.

12. The system of claim 10, wherein said indications of number and position of the eliminated null packets consist of at least one byte appended to each DVB packet applied to the ACM modulator, which value represents the number of null packets that have been deleted by the null-packet eliminator before said DVB packet applied to the ACM modulator and after the previous DVB packet applied.

* * * * *